(12) United States Patent
Newcomb

(10) Patent No.: US 11,478,978 B2
(45) Date of Patent: Oct. 25, 2022

(54) SYSTEMS AND METHODS OF MAKING A COMPOSITE ARTICLE

(71) Applicant: GM GLOBAL TECHNOLOGY OPERATIONS LLC, Detroit, MI (US)

(72) Inventor: Bradley A. Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 16/593,584

(22) Filed: Oct. 4, 2019

(65) Prior Publication Data

US 2021/0101326 A1    Apr. 8, 2021

(51) Int. Cl.
*B29C 53/80*    (2006.01)
*B29C 53/60*    (2006.01)
(Continued)

(52) U.S. Cl.
CPC ........ *B29C 53/8066* (2013.01); *B29C 53/582* (2013.01); *B29C 53/60* (2013.01); *B29C 53/84* (2013.01); *B29B 15/125* (2013.01)

(58) Field of Classification Search
CPC ..... B29C 53/8066; B29C 53/60; B29C 53/84; B29C 53/582; B29C 53/845; B29C 53/62;
(Continued)

(56) References Cited

U.S. PATENT DOCUMENTS 7,819,462 B1    10/2010  Owens
8,033,592 B2    10/2011  Hsu et al.
(Continued)

FOREIGN PATENT DOCUMENTS

CN    102555238 A    7/2012
CN    107001653 A    8/2017
(Continued)

OTHER PUBLICATIONS

John A. Pojman, et. al., "Factors Affecting Propagating Fronts of Addition Polymerization: Velocity, Front Curvature, Temperature Profile, Conversion, and Molecular Weight Distribution", Journal of Polymer Science: Part A Polymer Chemistry: , vol. 33,643-652 (1995) (Year: 1995).*

(Continued)

*Primary Examiner* — Jacob T Minskey
*Assistant Examiner* — S. Behrooz Ghorishi
(74) *Attorney, Agent, or Firm* — Harness, Dickey & Pierce, P.L.C.

(57) ABSTRACT

Methods of making a composite article are provided herein. The method can include an unwinding step including unwinding a fiber substrate material from a creel at an unwinding velocity and an impregnation step including applying an uncured resin composition to the fiber substrate material to form a resin-fiber material. The method further includes a winding step comprising applying the resin-fiber material onto a shaped surface at a winding velocity and a solidifying step comprising applying heat to the resin-fiber material to initiate an exothermic reaction comprising polymerization, cross-linking, or both of the uncured resin composition. Temperature of the resin-fiber material can be monitored during operation of the method and a polymerization front velocity set point ($v_{pfs}$) and an operating polymerization front velocity ($v_{pfo}$) can be determined. Parameters can be adjusted to maintain a $v_{pfo}$ that is substantially the same as the $v_{pfs}$. Systems for performing said methods are also provided.

18 Claims, 7 Drawing Sheets

(51) Int. Cl.
  *B29C 53/84* (2006.01)
  *B29C 53/58* (2006.01)
  *B29B 15/12* (2006.01)

(58) Field of Classification Search
  CPC ... B29C 70/30; C08F 2400/02; B29B 15/125; B29B 15/122
  See application file for complete search history.

(56) References Cited

U.S. PATENT DOCUMENTS

| | | | |
|---|---|---|---|
| 8,109,492 | B2 | 2/2012 | Winocur |
| 8,961,724 | B2 | 2/2015 | Polewarczyk et al. |
| 9,227,673 | B2 | 1/2016 | Berger et al. |
| 10,308,201 | B2 | 6/2019 | Newcomb et al. |
| 2009/0121728 | A1* | 5/2009 | Uozumi ............... B29C 53/8066 356/630 |
| 2016/0264082 | A1 | 9/2016 | Berger et al. |
| 2018/0230642 | A1* | 8/2018 | Robertson ............... C08G 61/08 |
| 2018/0327531 | A1 | 11/2018 | Moore et al. |
| 2019/0111872 | A1 | 4/2019 | Newcomb et al. |
| 2019/0232903 | A1 | 8/2019 | Newcomb et al. |
| 2020/0269529 | A1* | 8/2020 | De Kock ............... B29C 70/525 |

FOREIGN PATENT DOCUMENTS

| | | |
|---|---|---|
| CN | 112606423 A | 4/2021 |
| DE | 19710549 A1 | 9/1998 |
| DE | 19850335 A1 | 5/2000 |
| DE | 102015105039 A1 | 10/2016 |
| DE | 102020124640 A1 | 4/2021 |
| EP | 0269197 A2 | 6/1988 |
| EP | 3327424 A1 | 5/2018 |

OTHER PUBLICATIONS

First Office Action for Chinese Patent Application No. 202011071182.3 dated Mar. 15, 2022, with correspondence dated Mar. 17, 2022, from China Patent Agent (H.K.) Ltd. summarizing contents; 22 pages.

First Office Action for German Patent Application No. 10 2020 124 640.4 dated Jul. 2, 2021, with correspondence dated Jul. 20, 2021, from Manitz Finsterwald Patent—und Rechtsanwaltspartnerschaft mbB; 10 pages.

* cited by examiner

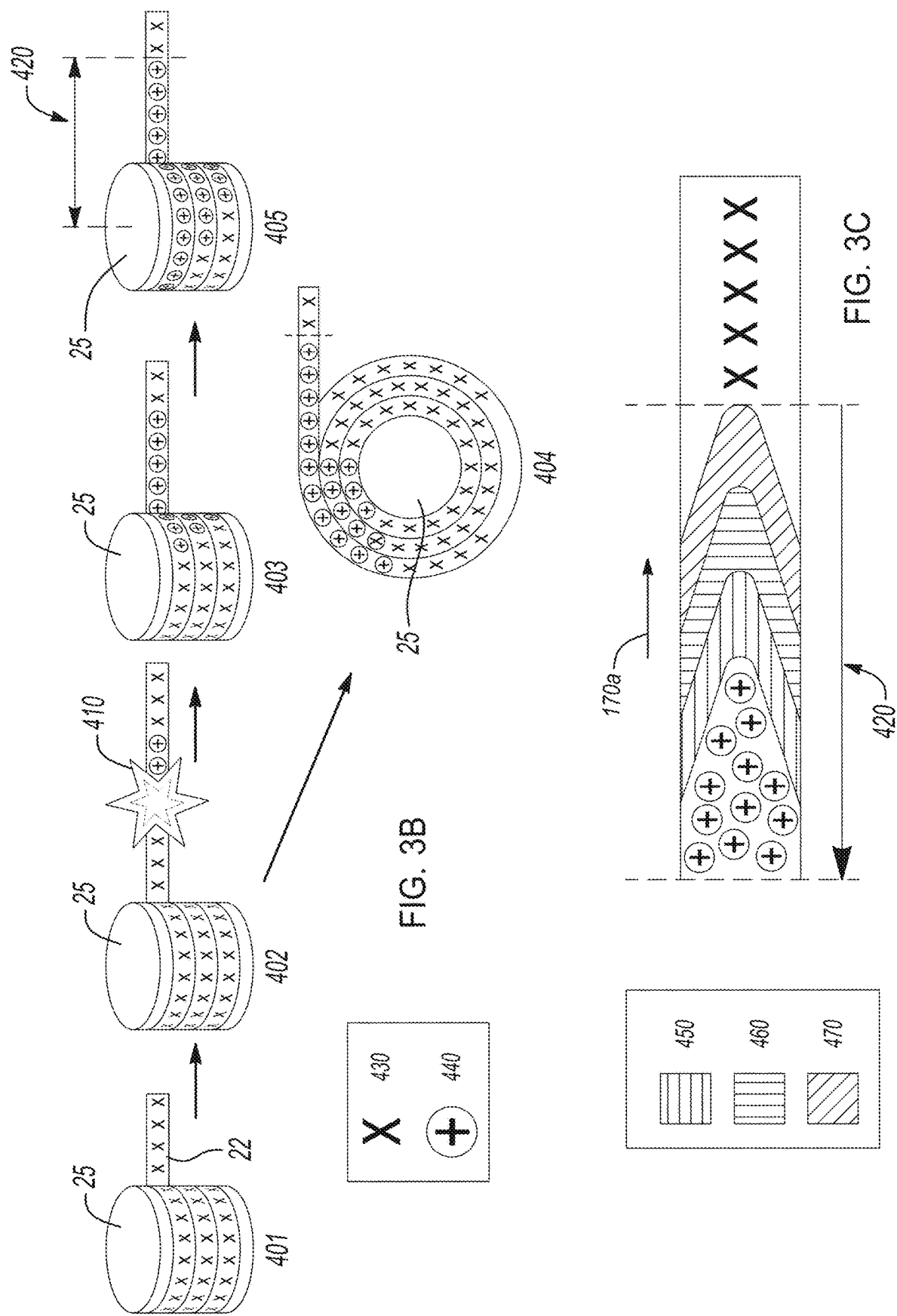

SYSTEMS AND METHODS OF MAKING A COMPOSITE ARTICLE

INTRODUCTION

This section provides background information related to the present disclosure which is not necessarily prior art.

Composite articles can be formed by using a fiber substrate material, for example, carbon fibers, that also includes a resin material. The fiber substrate material including the resin material can be applied to a mandrel or other shaped surface to form a composite or layup that conforms to the desired geometry of the finished composite article. The composite may include one or more layers, where each layer can be formed from contacting and/or overlapping strips of the fiber substrate material including the resin material. Following application of the fiber substrate material to the mandrel or other shaped surface, the resin can be cured or solidified thereby bonding single or multiple layers together in the composite.

Typically, the fiber substrate material is unwound from a creel or spool and then "wetted" with the resin as it is used, usually by submersion through a bath and the wetted fiber with resin can then be applied or wound to the mandrel or other shaped surface. A curing process is required to solidify the resin material to form the composite article. Curing typically involves placing the mandrel or other shaped surface with the applied fiber substrate material and resin in an oven for a period of time, for example, ranging from 30 minutes to 2 hours depending on the cure temperature. However, such cure times and processes require high energy and expensive equipment. Thus, systems and methods for producing composite articles, which can be achieved with lower energy curing are needed.

SUMMARY

This section provides a general summary of the disclosure, and is not a comprehensive disclosure of its full scope or all of its features.

The present disclosure relates to methods and systems for making a composite article with lower energy curing.

In various aspects, the present disclosure provides a method of making a composite article. The method includes an unwinding step, an impregnation step, a winding step and a solidifying step. The unwinding step includes unwinding a fiber substrate material from a creel at an unwinding velocity ($\omega_1$). The impregnation step includes applying an uncured resin composition to the fiber substrate material to form a resin-fiber material. The winding step includes applying the resin-fiber material onto a shaped surface at a winding velocity ($\omega_2$). The solidifying step includes applying heat indirectly or directly to the resin-fiber material to initiate an exothermic reaction including polymerization, cross-linking, or both of the uncured resin composition to form the composite article. The method further includes monitoring the resin-fiber material and determining a polymerization front velocity set point ($v_{pfs}$) and an operating polymerization front velocity ($v_{pfo}$). One or more of the following parameters can be adjusted to maintain a $v_{pfo}$ that is substantially the same as the $v_{pfs}$: (i) the unwinding velocity ($\omega_1$) and/or the winding velocity ($\omega_2$); and (ii) the heat applied to the resin-fiber material.

In various aspects, the shaped surface has a cylindrical shape and the resin-fiber material is circumferentially applied around the shaped surface. The shaped surface can include a metal material.

In various aspects, the solidifying step includes applying heat to the shaped surface while the shaped surface rotates and winds the resin-fiber material, wherein polymerization, cross-linking or both of the uncured resin composition progresses in an outward radial direction, a circumferential direction, an axial direction, or combination thereof through a thickness of the resin-fiber material present on the shaped surface.

In various aspects, the heat is applied continuously to the shaped surface while the shaped surface rotates and winds the resin-fiber material.

In various aspects, the solidifying step includes applying heat to the resin-fiber material as it is wound onto the shaped surface, wherein polymerization, cross-linking or both of the uncured resin composition progresses in an inward radial direction, a circumferential direction, an axial direction, or combination thereof through a thickness of the resin-fiber material present on the shaped surface.

In various aspects, the solidifying step includes ceasing application of heat after initiation of the exothermic reaction, wherein polymerization, cross-linking or both of remaining uncured resin composition continues in a radial direction, a circumferential direction, an axial direction, or combination thereof through a thickness of the polymer-fiber precursor material in the absence of the application of heat to form the composite article.

In various aspects, the heat is applied from a heat source selected from the group consisting of a heating coil, a heated rod, a heat blanket, a heat lamp, heated air, an ultraviolet source, an oven, or a combination thereof.

In various aspects, the uncured resin composition can include a thermoplastic resin or a thermoset resin, and optionally, a hardener component, a catalyst component or a combination thereof. The fiber substrate material is selected from the group consisting of carbon fibers, glass fibers, basalt fibers, aramid, polyethylene fibers, polypropylene fibers, natural fibers, and a combination thereof.

In various aspects, the heat is applied for a period of 300 seconds or less.

In various aspects, the shaped surface is a mandrel, or a metal component disposed on a mandrel, wherein the resin-fiber material is applied onto the metal component.

In various aspects, the composite article includes the shaped surface, a solidified resin composition, and the fiber substrate material or the composite article includes the solidified resin composition, the fiber substrate material, and the metal component.

In various aspects, the impregnation step further includes separately supplying a resin component, an optional hardener component, and an optional catalyst component to a mixer to form the uncured resin composition.

In various aspects, wherein application of the uncured resin composition includes separately applying: (i) a resin component to the fiber substrate material; and (ii) a hardener component, a catalyst component, or both to the fiber substrate material.

In various aspects, the present disclosure also provides a system for making a composite article. The system includes an unwinding component, a resin bath component, a winding component, a polymerization front monitoring system, and a controller. The unwinding component includes a creel wound with a fiber substrate material, and a first motor operably connected to the creel and configured to rotate the creel at an unwinding velocity ($\omega_1$). The resin bath component is for impregnating the fiber substrate material received therein with an uncured resin composition to form a resin-fiber material and can include a single container for containing the uncured resin composition, or a first container for containing a resin component and a second container for containing a hardener component, a catalyst component, or both. The winding component includes a mandrel for receiving the resin-fiber material, a second motor operably connected to the mandrel and configured to rotate the mandrel at a winding velocity ($\omega_2$), and a heat source for solidifying the uncured resin composition to form the composite article. The polymerization front monitoring system is configured to determine a polymerization front velocity set point ($v_{pfs}$) and an operating polymerization front velocity ($v_{pfo}$). The controller is in communication with the unwinding component, the winding component, and the polymerization front monitoring system. In order to maintain a $v_{pfo}$ that is substantially the same as the $v_{pfs}$, the controller is configured to adjust one or more of the following parameters: (i) the unwinding velocity ($\omega_1$) and/or the winding velocity ($\omega_2$); and (ii) the heat source.

In various aspects, the heat source initiates an exothermic reaction including polymerization, cross-linking, or both of the uncured resin composition.

In various aspects, the resin bath component further includes a third container for containing a resin component, optionally, a fourth container for containing a hardener component; optionally, a fifth container for containing a catalyst component; and a mixer for mixing the resin component, optional hardener component, and optional catalyst component. The mixer is in fluid communication with the single container, the third container, the optional fourth container, and the optional fifth container.

In various aspects, the heat source is selected from the group consisting of a heating coil, a heated rod, a heat blanket, a heat lamp, a heated wire, heated air, an ultraviolet source, an oven, or a combination thereof.

In various aspects, the uncured resin composition includes a thermoplastic resin or a thermoset resin, and optionally, a hardener component, a catalyst component or a combination thereof and wherein the fiber substrate material is selected from the group consisting of carbon fibers, glass fibers, basalt fibers, aramid, polyethylene fibers, polypropylene fibers, natural fibers, and a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3B illustrates application of the control feedback loop of FIG. 3A.

FIG. 3C illustrates an exploded view of FIG. 3B.

Corresponding reference numerals indicate corresponding parts throughout the several views of the drawings.

DETAILED DESCRIPTION

Figure 1A:
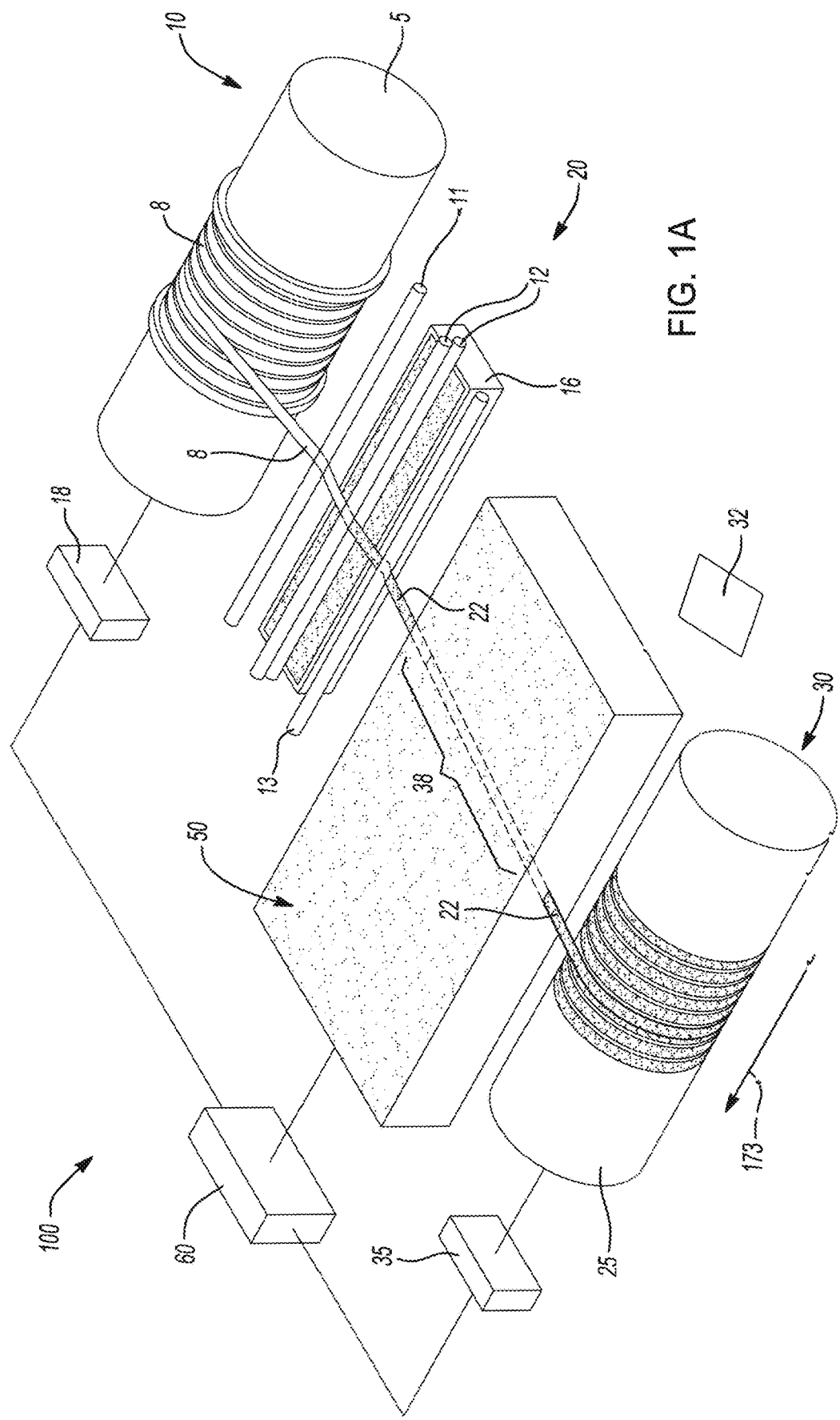
FIG. 1A illustrates a system for making a composite article according to some aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Systems and methods of making a composite article are provided herein, which can advantageously be achieved via lower energy curing or solidification processes. An exemplary system 100 for manufacturing a composite article is illustrated in FIG. 1A, by way of example. The system 100 includes an unwinding region 10 that receives a roll of fiber substrate material 8 on a creel 5 (also referred to as a "spool"). The fiber substrate material 8 is wound on the creel 5 and is to be impregnated with an uncured resin composition after being unwound from creel 5. Fiber substrate material 8 may be a roll of fiber-based material, fabric material, or a conventional roll of pre-preg tow material, by way of non-limiting example. A first motor 18 may be operably connected to the creel 5 and configured to rotate creel 5 at an unwinding velocity ($\omega_1$). The fiber substrate material 8 can include tape, tow, and cloth. "Tape" generally refers to uniaxial reinforcement fibers that extend along a single axis of the strip material. "Tow" is a type of substrate that typically comprises untwisted or twisted bundles of continuous filaments. Tow filaments often comprise carbon or glass. The term "cloth" generally refers to reinforcement fibers laid along at least two different axes within the material. Cloth is commercially available as bi-axial, tri-axial and quad-axial, indicating fibers extending in two, three, or four different axes, respectively. The fibers may optionally be woven with one another, or may be manufactured as non-woven cloth.

The fiber substrate material 8 may include: carbon fibers, glass fibers (e.g., fiber glass, quartz), basalt fibers, aramid fibers (e.g., KEVLAR®, polyphenylene benzobisoxazole (PBO), polyethylene fibers (e.g., ultra-high molecular weight polyethylene (UHMWPE)), polypropylene fibers (e.g., high-strength polypropylene), natural fibers (e.g., cotton, flax, cellulose, spider silk), and combinations thereof, by way of non-limiting example.

The system 100 also includes a resin bath component 20 for impregnating the fiber substrate material 8 with an uncured resin composite. Fiber substrate material 8 can be unwound from creel 5 and directed towards a first roller 11. First roller 11, second roller(s) 12, and third roller 13 cooperate to draw and unwind fiber substrate material 8, so that it passes under tension through a single container 16 containing an uncured resin composition. In any embodiment, fiber substrate material 8 can pass above or below first roller 11 and be drawn between second rollers 12 such that fiber substrate material 8 contacts (e.g., is submerged within) a bath of uncured resin composition in single container 16 and is drawn up via third roller 13, either above or below third roller 13. Although, two second rollers 12 are shown, it is contemplated herein that only one second roller 12 may be used such that fiber substrate material 8 passes above first roller 11 and is drawn beneath second roller 12 such that fiber substrate material 8 contacts the uncured resin composition in single container 16 and is drawn up via third roller 13. As fiber substrate material 8 passes into contact with the uncured resin composition in single container 16, the uncured resin composition is deposited, coated on, and/or impregnated within fiber substrate material 8 to form resin-fiber material 22 exiting the single container 16. As appreciated by those of skill in the art, a quantity of uncured resin composition applied to the fiber substrate material 8 can be metered through the use of a squeegee, opposing rollers (e.g., nip rollers) or doctor blade, pump, and the like, which are not shown, but are well known to those of skill in the art.

The uncured resin composition may include a resin component, such as as any suitable thermoplastic resin or thermoset resin. The thermoplastic resin may include precursors or monomers that are or can form: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), fully or partially aromatic polyamide resins, polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins. The thermoset resin may include include precursors or monomers that are or can form: benzoxazine, a bis-maleimide (BMI), a cyanate ester, an epoxy, a phenolic (PF), a polyacrylate (acrylic), a polyimide (PI), an unsaturated polyester, dicyclopentadiene (DCPD) and/or 5-ethylidene-2-norbnene (ENB), a polyeurethane (PUR), a vinyl ester, a siloxane, or any combination or copolymer of these resins. Suitable epoxy resins include, but are not limited to: bisphenol A epoxy resin; bisphenol F epoxy resin; alicyclic epoxy resin; bisphenol A epoxy resin acrylates or methacrylates; alkoxylated bisphenol epoxy resin acrylates of methacrylates, alkyl epoxy resin; bisphenol A diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, diglycidyl ether of bisphenol A (DGEBA or BADGE), diglycidyl ether bisphenol F (DGFBA), and the like; and combinations thereof.

The uncured resin composition can further include a suitable hardener component (also referred to as a "curing agent"), a suitable catalyst component with an optional inhibitor, or a combination thereof. Suitable hardeners include, but are not limited to amine-based hardeners, such as aliphatic amines (e.g., diethylenetriamine (DETA)), aromatic amines (e.g., m-xylenediamine, m-phenylene diamine (m-PDA), methylene dianiline (MDA), diaminophenyl sulfone (DDS), cycloaliphatic amines (e.g., aminoethylpiperazine, bis-(p-aminocyclohexyl)methane) (PACM), diaminocyclohexane (DACH), bis-(dimethyldi-aminocyclohexyl)methane) (DMCH), polyetheramines, polyamides (e.g., di cyandiamide (DICY)), amidoamines, ethyleneamines, imidazoles, and anhydrides. In any embodiment, the resin composition may include a high energy density thermoset, for example, having a heat of reaction of about 200 J/g to about 500 J/g, preferably 300 J/g. Commercially available high energy density thermoset resins and hardeners include, but are not limited to Araldite® LY3585 resin (available from Huntsman International LLC), Aradur® 3475 hardener (available from Huntsman International LLC), and XB 3458 hardener (available from Huntsman International LLC). Suitable catalysts include, but are not limited to: a Grubbs catalyst (e.g., first generation, second generation, third generation and derivatives thereof), Hoveyda-Grubbs catalyst (e.g., first generation and second generation), which each can include a transition metal, such as ruthenium, optionally mixed with an inhibitor, such as trimethyl phosphite, triethyl phosphite, or tributyl phosphite; and a solvent, phenylcyclohexane. Other suitable inhibitors include quinones (e.g. hydroquinone) and their derivatives, sterically hindered phenols, tertiary butyl catechol (TBC), trimethyl phosphite, triethyl phosphite, tributyl phosphite, and alkyl phosphite.

In any embodiment, the uncured resin composition may have a $T_g$ (glass transition temperature) of less than or equal to about 0° C., for example, −50° C. to −20° C. In any embodiment, the solidified resin composition may have a $T_g$ (glass transition temperature) of greater than or equal to about 60° C., greater than or equal to about 70° C., greater than or equal to about 80° C., greater than or equal to about 90° C., greater than or equal to about 100° C., greater than or equal to about 120° C., greater than or equal to about 150° C., greater than or equal to about 175° C., or about 200° C. In any embodiment, the uncured resin composition may have a $T_g$ of about 60° C. to about 200° C., about 70° C. to about 200° C., or about 80° C. to about 200° C.

As appreciated by those of skill in the art, the resin-fiber material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

The system 100 also includes a winding component 30 for receiving and winding the resin-fiber material 22 onto a shaped surface 25 (e.g., a mandrel). Upon exiting single container 16, resin-fiber material 22 is wound upon shaped surface 25 to a desired thickness. A second motor 35 may be operably connected to the shaped surface 25 (e.g., a mandrel) and configured to rotate shaped surface 25 at a winding velocity ($\omega_2$). Although two motors are shown in FIG. 1A, it is contemplated herein that one motor may be present and can be operably connected to the creel 5 and the shaped surface 25. As shown in FIG. 1A, the shaped surface 25 may be a cylindrical shape with a substantially round cross-section for forming a cylindrically shaped composite article. Although not shown, it is contemplated herein, that the shaped surface 25 can have a void defined therein. Alternatively, the shaped surface 25 may be any other suitable shape for a forming a correspondingly shaped composite article. Such suitable shapes include, but are not limited to shapes having the following cross-sections: a substantially rectangular cross-section, a polygon cross-section, a star cross-section, and a multi-lobed cross-section. As understood herein, "substantially round" may include circular and oval cross-sections and the dimensions of the cross-section may deviate in some aspects. As understood herein, "substantially rectangular" may include square cross-sections and the dimensions of the cross-section may deviate in some aspects. As understood herein, "polygon" may include triangular, pentagonal, hexagonal, heptagonal, octagonal, and so on cross-sections and the dimensions of the cross-section may deviate in some aspects. As understood herein, "star" may include from five points to twelve points, for example, a five-pointed star, a six-pointed star, a seven-pointed star and so on. As used herein, the term "multi-lobe" refers to a cross-sectional shape having a point (not necessarily in the center of the cross-section) from which at least two lobes extend (not necessarily evenly spaced or evenly sized), for example a bi-lobe, tri-lobe, and so on.

Figure 1B:
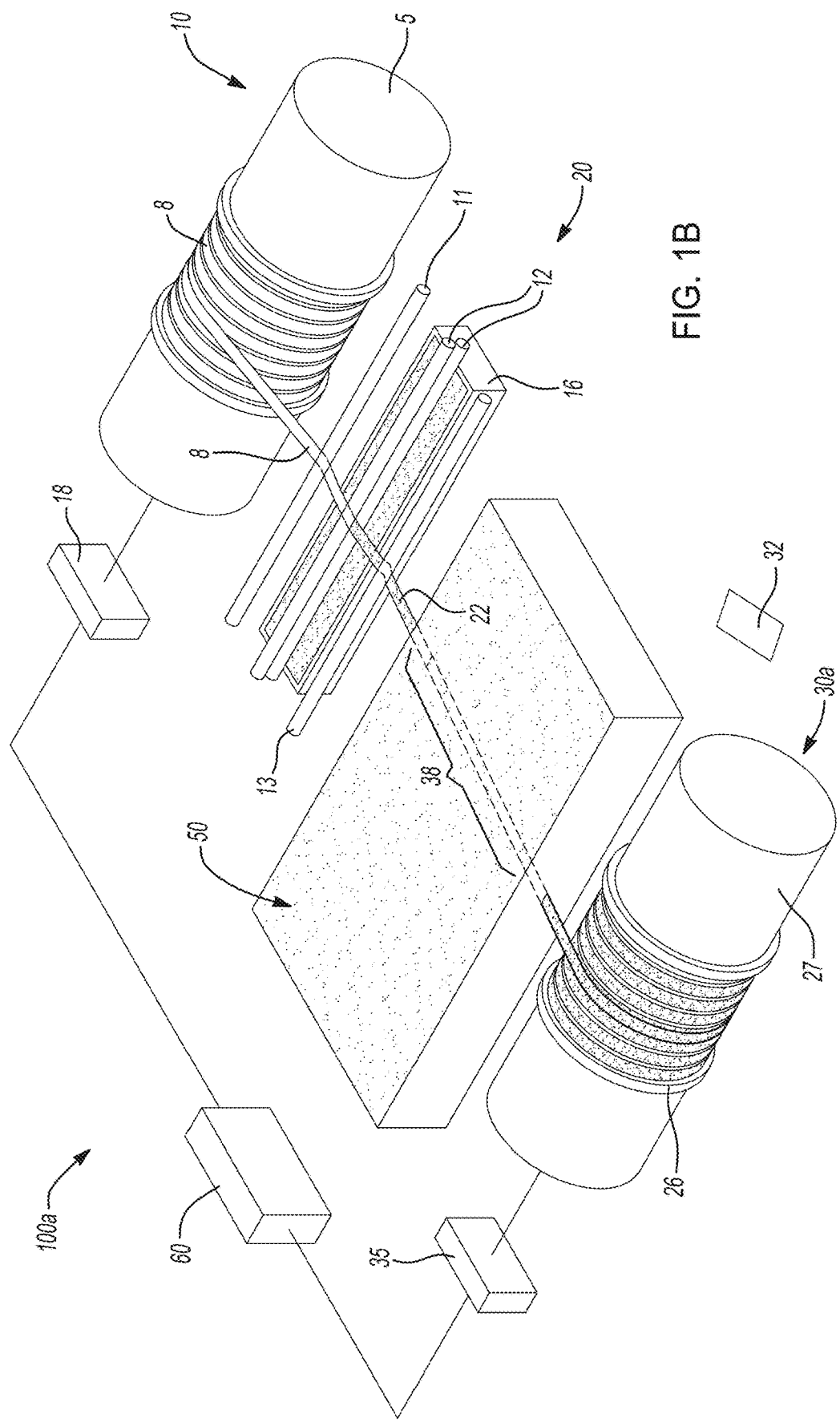
FIG. 1B illustrates an alternative system for making a composite article according to some aspects of the present disclosure.

Additionally or alternatively, the shaped surface 25 can include one or more separate components, for example, a first component and a second component. For example, as illustrated in FIG. 1B, in system 100a, a winding component 30a can include a first component 26 and a second component 27, wherein the first component 26 is disposed onto the second component 27. The first component 26 and the second component 27 each can be any suitable material, for example, a metal material, such as aluminum or steel. The resin-fiber material 22 can be wound onto the first component 26. In some embodiments, first component 26, for example, a metal component such as a motor housing, can be intended for incorporation into the finished composite article, and the second component 27 can be a mandrel, which is removed after solidification of the uncured resin composition.

Referring back to FIG. 1A, the winding component 30 may also include a heat source 32 for solidifying the uncured resin composition to form the composite article. In any embodiment, the heat source 32 may heat the shaped surface 25 (e.g., a mandrel), for example, as the resin-fiber material 22 is wound around the shaped surface 25 (e.g., mandrel). Alternatively, the heat source 32 may apply heat to the resin-fiber material 22 present on the shaped surface 25 (e.g., mandrel) and/or to the resin-fiber material 22 just prior to its application onto the shaped surface 25 (e.g., mandrel). Heat from heat source 32 may be applied for a suitable duration to initiate an exothermic reaction of the uncured resin material thereby initiating solidification (e.g., curing) of the uncured resin composition. The exothermic reaction can include polymerization, cross-linking, or both of the uncured resin composition. In any embodiment, heat can be applied from the heat source 32 for a period of 10 minutes (600 seconds) or less, 5 minutes (300 seconds) or less, 60 seconds or less, 30 seconds or less, 15 seconds or less, 5 seconds or less, 1 second or less; 1 millisecond or less, or about 1 microsecond; or from about 1 microsecond to about 10 minutes, 1 microsecond to about 10 minutes, about 1 microsecond to about 5 minutes, about 1 microsecond to about 60 seconds, about 1 microsecond to about 30 seconds, about 1 second to about 15 seconds, or about 1 second to about 5 seconds.

Heat may be supplied continuously as the resin-fiber material 22 is wound around the shaped surface 25 (e.g., mandrel). Additionally or alternatively, once the exothermic reaction is initiated, application of heat from heat source 32 may be ceased. For example, application of heat from heat source 32 may be stopped once the resin-fiber material reaches a sufficient temperature (referred to as an "initiation temperature") such that polymerization, cross-linking or both of the uncured resin composition can occur in a self-propagating manner via the exothermic reaction initiated and heat generated therefrom. This initiation temperature is dependent upon the uncured resin composition selected as understood by one of ordinary skill in the art. In some embodiments, once the initiation temperature is achieved, for example, once the initiation temperature is measured or observed, the heat source 32 can be turned off. Since the exothermic reaction is a self-propagating reaction generating heating, polymerization, cross-linking, or both of remaining uncured resin composition can continue in a radial direction, an axial direction, a circumferential direction or a combination thereof through the resin-fiber material 22 in the absence of heat from heat source 32 to form the composite article. In other words, solidification of the uncured resin material can first be initiated by a heat source 32, but once heat source 32 is stopped or turned off, solidification (e.g., curing) can continue in a radial direction, a circumferential direction, an axial direction, or a combination thereof through a thickness of the resin-fiber material 22 due to heat generated by the exothermic reaction whereby a portion of to substantially all of the uncured resin composition can solidify. Therefore, advantageously only a small amount of energy is needed to form the composite article.

Figure 1C:
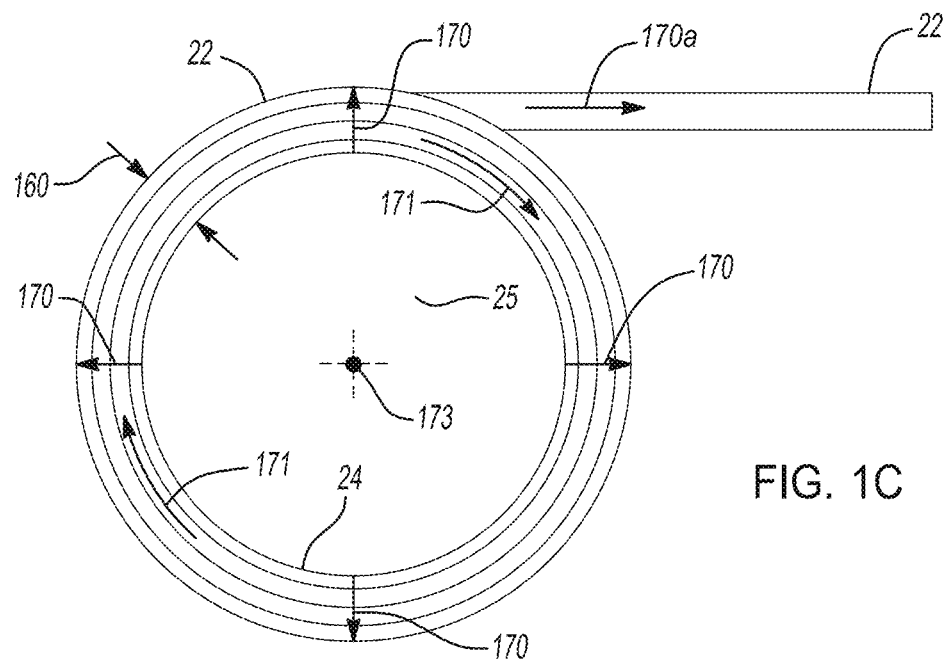
FIGS. 1C-1E illustrate solidification of uncured resin material according to some aspects of the present disclosure.

As further illustrated in FIG. 1C, application of heat from heat source 32, for example to the shaped surface 25 (e.g., mandrel) can initiate the exothermic reaction at least at a portion of the uncured resin composition for example, at first surface 24, adjacent to the shaped surface 25 (e.g., mandrel) via heat transfer from the shaped surface 25. Polymerization, cross-linking, or both of the remaining uncured resin composition can continue in an outward radial direction as illustrated by arrows 170, a circumferential direction as illustrated by arrows 171, an axial direction as illustrated by arrows 173, or a combination thereof through the thickness 160 of the resin-fiber material 22 and into a portion of the resin-fiber material 22 prior to its application onto the shaped surface 25 (e.g., mandrel). Polymerization, cross-linking, or both of the remaining uncured resin composition can continue even in the absence of heat from the heat source 32 due to the self-propagating exothermic reaction initiated. This progression of the polymerization, cross-linking, or both of the remaining uncured resin composition is referred to herein as a "polymerization front" and the velocity (mm/s) at which the polymerization front travels, referred to herein as "polymerization front velocity," can be measured by one of ordinary skill in the art. In other words, as illustrated in FIG. 1C, the polymerization front can progress in an outward radial direction as illustrated by arrows 170, a circumferential direction as illustrated by arrows 171, an axial direction as illustrated by arrows 173, or a combination thereof through the thickness 160 of the resin-fiber material 22 and into a portion of the resin-fiber material 22 being delivered onto the shaped surface 25 (e.g., mandrel). For example, a person of ordinary skill in the art understands that as illustrated in FIG. 1C, polymerization can progress from the shaped surface 25 back toward the creel 5. Polymerization front velocity in mm/sec can be measured by a polymerization front monitoring system (see polymerization front monitoring system 50 described below), for example, thermal imaging system which can record a thermal video of the polymerization front. The winding velocity ($\omega_2$) of the shaped surface 25 (e.g., mandrel) can be occurring at a known velocity. If the polymerization front is not moving relative to the shaped surface 25 (e.g., mandrel), the winding velocity ($\omega_2$) (in revolutions/sec) is related to polymerization front velocity via the equation, $v=\omega_2 r$, where r is the radius of the wrapped shaped surface 25 (e.g., mandrel) and v is polymerization front velocity. It is noted that r changes over time as winding of the resin-fiber material 22 continues and thickness 160 increases. If the polymerization front is moving relative to the shaped surface 25 (e.g., mandrel), the location of the polymerization front can be quantified by knowing its position with respect to time and by knowing the winding velocity ($\omega_2$).

Figure 1E:
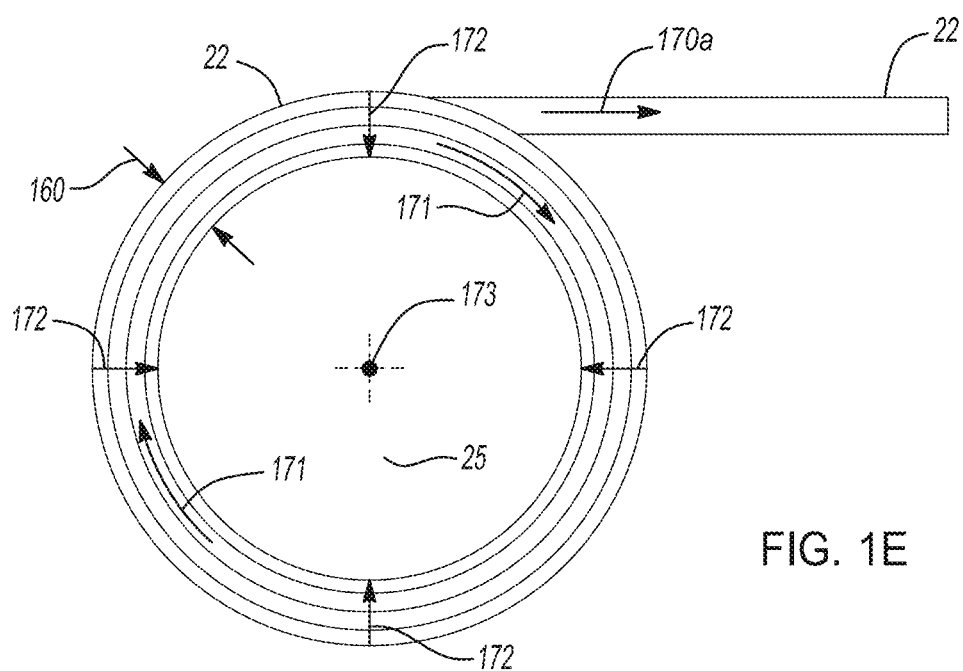
Figure 1D:
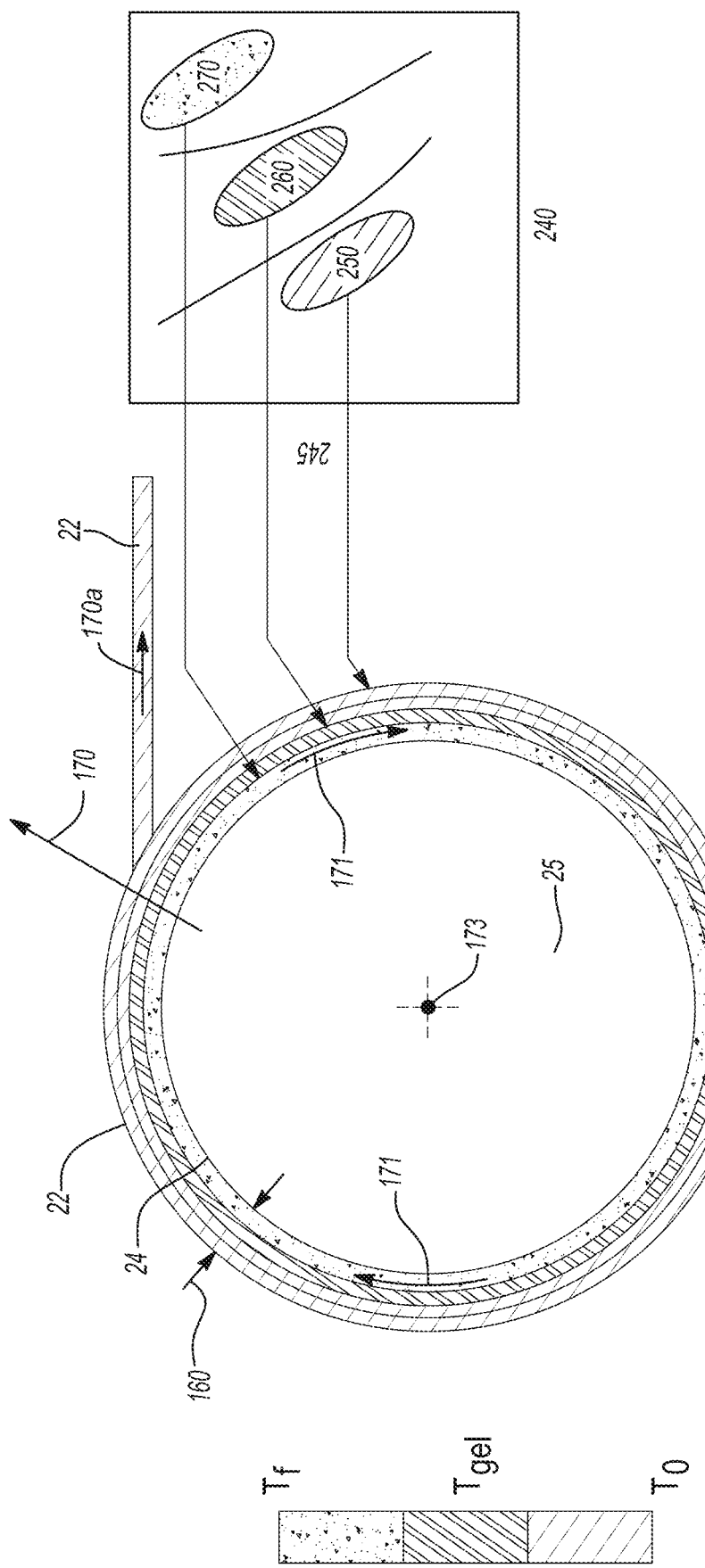

FIG. 1D further illustrates an exemplary progression of the solidification process of the uncured resin composition adjacent to the shaped surface 25 (e.g., mandrel) once the exothermic reaction is initiated in the uncured resin composition for example, at first surface 24, adjacent to shaped surface 25. The graph shows gel or vitrification time 240 v. isothermal cure temperature 245 with the liquid region 250, sol/gel/rubber region 260, and gelled/glass region 270. As the polymerization, cross-linking, or both, i.e., the polymerization front, continues or moves through the thickness 160 of the resin-fiber material 22 in an outward radial direction illustrated by arrows 170, a circumferential direction as illustrated by arrows 171, an axial direction as illustrated by arrows 173, or a combination thereof and into a portion of the resin-fiber material 22 being delivered onto the shaped surface 25 (e.g., mandrel) illustrated by arrows 170a, the uncured resin composition progresses through the states of the liquid region 250, sol/gel/rubber region 260, and gelled/glass region 270, as time and temperature increases. The temperature and time at which the uncured resin composition is in a state corresponding to the liquid region 250, sol/gel/rubber region 260 and/or gelled/glass region 270 depends on the uncured resin composition used and the associated curing kinetics of the uncured resin composition and can be readily determined by a person of ordinary skill in the art. It is contemplated herein, that depending on the time duration of the exothermic reaction (e.g., how long the exothermic reaction has been proceeding), the temperature of the uncured resin composition, as well as the particular uncured resin composition used, the state of the uncured resin composition can exist in one, two, or all three of the liquid region 250, sol/gel/rubber region 260 and gelled/glass region 270 during the methods described herein. As used herein, "solidified resin" or "cured resin" encompasses a resin composition in a state corresponding to its sol/gel/rubber region 260, gelled/glass region 270, or a combination thereof.

Alternatively, heat from heat source 32 may be applied to resin-fiber material 22 present on the shaped surface 25 (e.g., mandrel) and/or resin-fiber material 22 prior to being wound onto the shaped surface 25 (e.g., mandrel) after some resin-fiber material 22 has been wound onto the shaped surface 25 thereby initiating an exothermic reaction of the uncured resin composition. As illustrated in FIG. 1E, after initiating the exothermic reaction, polymerization, cross-linking, or both of the uncured resin composition, i.e., the polymerization front, can continue in an inward radial direction as illustrated by arrows 172, a circumferential direction as illustrated by arrows 171, an axial direction as illustrated by arrows 173, or a combination thereof through the thickness 160 of the resin-fiber material 22 as well as into a portion of the resin-fiber material 22 prior to its application onto the shaped surface 25 (e.g., mandrel). Polymerization, cross-linking, or both of the remaining uncured resin composition, i.e., the polymerization front, can continue even in the absence of heat from the heat source 32 due to the self-propagating exothermic reaction initiated.

In any embodiment, heat from heat source 32 can be applied to a single location, for example, as a single point source, resin-fiber material 22, two or more locations on the resin-fiber material 22, or heat can be substantially uniformly distributed around resin-fiber material 22. Additionally or alternatively, heat from the heat source 32 may be applied directly or indirectly as well as internally or externally. Any suitable heat source 32 for applying heat known to one of ordinary skill in the art may be used. Examples of a suitable external heat source 32 include, but are not limited to a heating coil (e.g., a copper coil for inducing a current and generating heat), a heated rod, a heat blanket, a heated wire, a heat lamp, heated air, an ultraviolet (UV) source (UV irradiation), an oven, a plasma source, a visible light source, or a combination thereof and is dependent on the chemistry chosen and known to those of skill in the art.

Referring back to FIG. 1A, the system 100 further includes a polymerization front monitoring system 50, which is configured to determine a polymerization front velocity and location of polymerization front on the resin-fiber material 22, for example, within a region 38 along the resin-fiber-material 22 as it is wound onto the shaped surface 25 (e.g., mandrel). In some embodiments, the polymerization front monitoring system 50 can be configured to monitor temperature of the resin-fiber material 22 as it is wound onto the shaped surface 25 (e.g., mandrel) in order to determine a polymerization front velocity and location of polymerization front on the resin-fiber material 22. Additionally or alternatively, the polymerization front monitoring system 50 can be configured to monitor index of refraction of the resin-fiber material 22 as it is wound onto the shaped surface 25 (e.g., mandrel) in order to determine index of refraction mismatch and a polymerization front velocity and location of polymerization front on the resin-fiber material 22.

It is contemplated herein that the polymerization front monitoring system 50 can be connected to a processor. As described herein, the processor may include a microprocessor, microcontroller, integrated circuit, digital signal processor, computer etc., which may include memory. The processor may be configured to perform any of the example processes described herein using any suitable hardware and/or software implementation as well as determine any example process parameters described herein, for example, polymerization front location, polymerization front velocity, etc. For example, the processor may execute computer-executable instructions stored in a memory, may include one or more logic gates, control circuitry, etc.

Determination of polymerization front velocity allows for determination of location of polymerization front on the resin-fiber material 22, for example, within region 38. The polymerization front monitoring system 50 can be any suitable device or system, for example, for determining the temperature of the resin-fiber material 22, for example, temperature sensors/probes, IR camera, or a thermal imaging system. Additionally or alternatively, the polymerization front monitoring system 50 can be any suitable device or system, for example, for determining the index of refraction calculation, for example, an optical camera.

While the uncured resin composition solidifies as it is being wound onto the shaped surface 25 (e.g., mandrel) it is desirable that the polymerization front does not progress too far along the resin-fiber material 22, for example within region 38, in a direction toward to the resin bath component 20 because the resin-fiber material 22 needs to remain flexible in order to be wound around the shaped surface 25. Thus, by monitoring temperature of the resin-fiber material 22, a desirable polymerization front velocity and and/or desirable polymerization front location can be determined, which can correspond to a polymerization front that has not progressed too far along far along the resin-fiber material 22 in a direction toward to the resin bath component 20. This desirable polymerization front velocity and/or desirable polymerization front location, as determined by one of ordinary skill in the art and depending upon the uncured resin composition used as well as the temperature of the heat applied and time duration, can be referred to as a "polymerization front velocity set point ($v_{pfs}$)" and a "polymerization front location set point ($l_{pfs}$)," respectively. As system 100 operates, an "operating polymerization front velocity ($v_{pfo}$)" and/or an "operating polymerization front location ($l_{pfo}$)" can be also be continuously determined, for example, via polymerization front monitoring system 50. It is desirable that the $v_{pfo}$ does not substantially deviate from the $v_{pfs}$ and/or that $l_{pfo}$ does not substantially deviate from $l_{pfs}$ because deviations from $v_{pfs}$ and/or $l_{pfs}$ indicate that the polymerization velocity is too high or two low indicating that the polymerization front location is not maintained within a desirable location on the resin-fiber material 22, for example, within region 38. In any embodiment, during operation, $v_{pfo}$ can equal $v_{pfs}$ and/or $l_{pfo}$ can equal $l_{pfs}$. In any embodiment, the $v_{pfo}$ can deviate about 20% or less from the $v_{pfs}$, about 15% or less from the $v_{pfs}$, about 10% or less from the $v_{pfs}$, about 5% or less from the $v_{pfs}$, or about 1% from the $v_{pfs}$; or a deviation from about 1-20%, about 1-15%, about 1-10% or about 1-5%. Additionally or alternatively, the $l_{pfo}$ can deviate about 20% or less from the $l_{pfs}$, about 5% or less from the $l_{pfs}$, about 10% or less from the $l_{pfs}$, about 15% or less from the $l_{pfs}$, or about 1% from the $l_{pfs}$; or a deviation from about 1-20%, about 1-15%, about 1-10% or about 1-5%.

In order to maintain a suitable polymerization front location and/or polymerization front velocity, for example, within region 38, various parameters of the system 100 can be adjusted. In other words, in order to maintain a $v_{pfo}$ that is substantially the same as the $v_{pfs}$ and/or a $l_{pfo}$ that is substantially the same as $l_{pfs}$, various parameters of the system 100 can be adjusted. Such parameters include, but are not limited to the unwinding velocity ($\omega_1$), winding velocity ($\omega_2$), temperature of heat applied from heat source 32, and a combination thereof. Thus, the system 100 can further include a controller 60 in communication (e.g., wired communication or wireless communication) with the unwinding component 10, the winding component 30 and the thermal imaging system 50. The controller 60 can be configured to adjust the aforementioned various parameters of the system 100 in order to maintain a $v_{pfo}$ that is substantially the same as the $v_{pfs}$ and/or a $l_{pfo}$ that is substantially the same as $l_{pfs}$, for example, within region 38. It is contemplated herein that the polymerization front velocities, polymerization front locations, and parameters described above can be monitored in real-time such that modifications and adjustment in the parameters can be made in real-time.

Figure 2A:
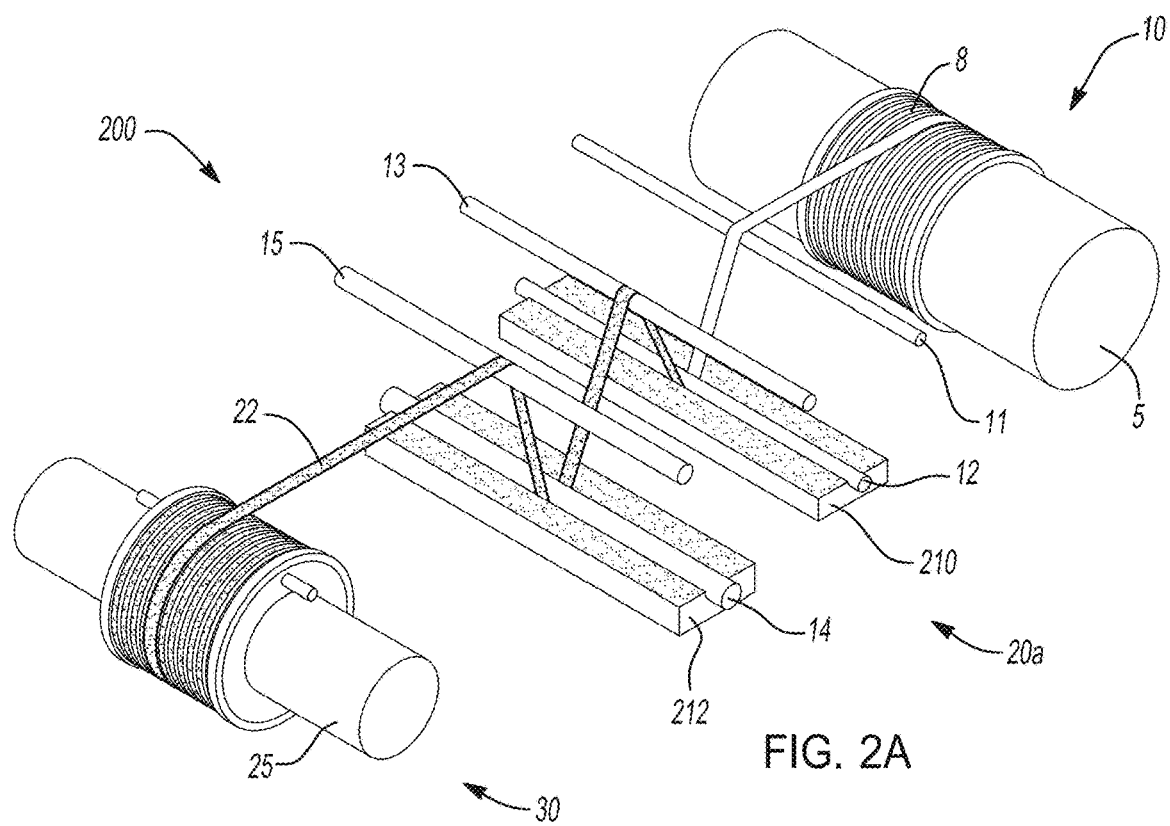
FIGS. 2A and 2B illustrate alternative systems for making a composite article according to some aspects of the present disclosure.

In an alternative embodiment, as illustrated in FIG. 2A, a resin bath component 20a may include a first container 210 and a second container 212 in a system 200. The first container 210 may contain a resin component as described herein, and the second container 212 may contain a hardener component as described herein, a catalyst component as described herein, or both. Fiber substrate material 8 can be unwound from creel 5 and directed towards a first roller 11. First roller 11, second roller 12, third roller 13, fourth roller 14, and fifth roller 15 cooperate to draw and unwind fiber substrate material 8, so that it passes under tension through a first container 210 containing a resin component as described herein and then through a second container 212 containing a hardener component as described herein, a catalyst component as described herein, or both to form resin-fiber material 22. In any embodiment, fiber substrate material 8 can pass above first roller 11 and be drawn below second roller 12 such that fiber substrate material 8 contacts (e.g., is submerged within) a bath of resin component in first container 210, is drawn up via third roller 13, then drawn below fourth roller 14 such that fiber substrate material 8 impregnated with resin contacts (e.g., is submerged within) a bath of hardener and/or catalyst in second container 212 and is drawn up via fifth roller 15. As appreciated by those of skill in the art, a quantity of uncured resin composition applied to the fiber substrate material 8 can be metered through the use of a squeegee, opposing rollers (e.g., nip rollers) or doctor blade, pump, and the like, which are not shown, but are well known to those of skill in the art. For example, fourth roller 14 may be comprised of two nip rollers which can provide squeezing force to adequately mix the resin component with the hardener component, the catalyst component, or both.

Figure 2B:
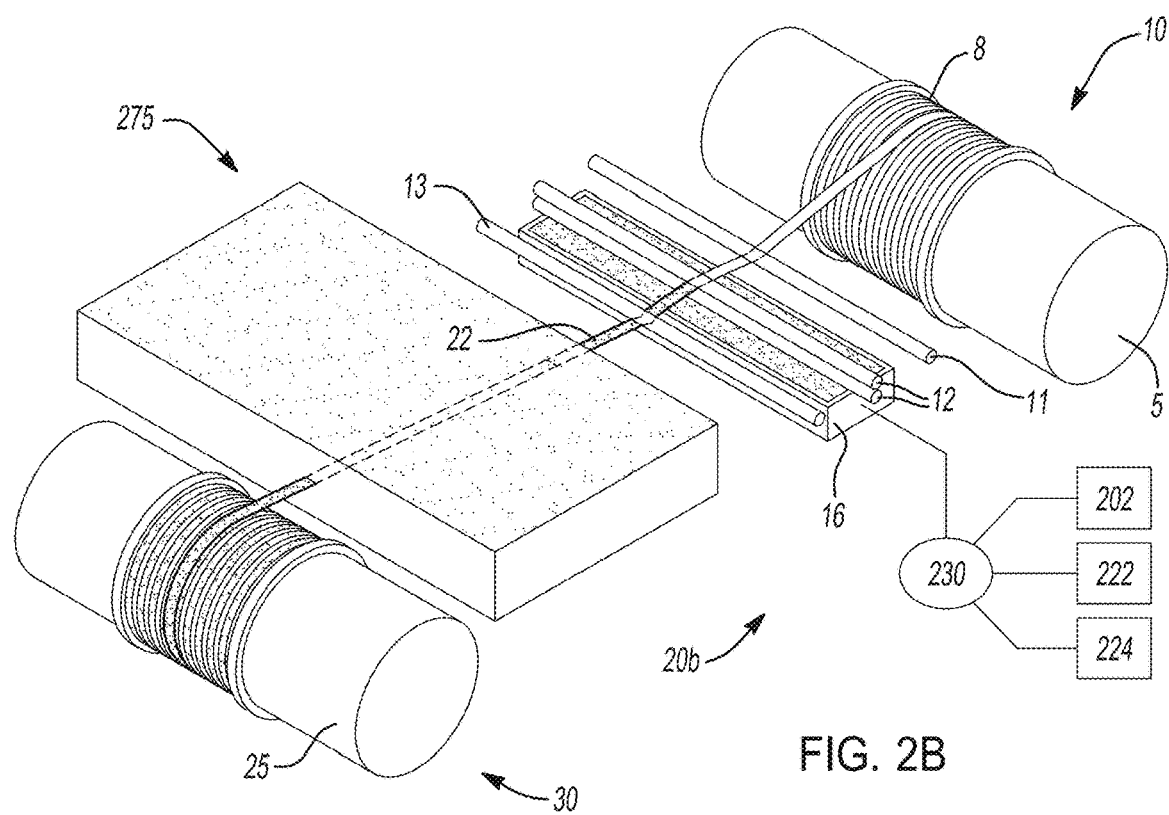

Additionally or alternatively, a resin bath component 20b can further comprise a third container 202, optionally a fourth container 222 and optionally a fifth container 224 in a system 275, as illustrated in FIG. 2B. The third container 202 can contain a resin component as described herein, the optional fourth container 222 may contain a hardener component as described herein, and the optional fifth container 224 can contain catalyst component as described herein. A mixer 230 may be in fluid communication with the third container 202, optional fourth container 222 and optional fifth container 224, to mix the resin component with the optional hardener component and optional catalyst component to form the uncured resin composition. The mixer 230 is also in fluid communication with the single container 16 so that the uncured resin composition may be supplied from the mixer 230 to the single container 16. In any embodiment, the resin component, the optional hardener component, and optional catalyst component can each be continuously supplied to mixer 230, which can continuously supply the uncured resin composition to single container 16. Alternatively, the optional hardener component, and optional catalyst component can each be intermittently supplied to mixer 230. The configurations illustrated in FIGS. 2A and 2B, can advantageously extend the pot-life of resin bath components 20, 20a, 20b and maintain a substantially uniform viscosity of the uncured resin composition. Although not all shown in FIGS. 2A and 2B, it is contemplated herein that all the components of system 100 may be incorporated into systems 200 and 275.

It should be noted that the configuration, arrangement, design, and number of rollers and other components in the systems described above and further herein are merely exemplary and may be modified as appreciated by those of skill in the art.

Methods of making a composite article, for example, using systems 100, 200, 275, are also provided herein. A method may include an unwinding step, an impregnation step, a winding step and a solidifying step. The unwinding step includes unwinding a fiber substrate material 8 as described herein from a creel 5 at an unwinding velocity ($\omega_1$). The impregnation step includes applying an uncured resin composition as described herein, for example, via resin bath component 20, 20a, or 20b, to the fiber substrate material 8 to form a resin-fiber material 22 as described herein. In some embodiments, a resin component, an optional hardener, and an optional catalyst and/or inhibitor may each be supplied separately from respective containers to a mixer to form the uncured resin composition, for example, via resin bath component 20a in FIG. 2A. In other embodiments, application of the uncured resin composition can include separately applying: (i) a resin component to the fiber-substrate material 8; (ii) a hardener, catalyst with optional inhibitor or both to the fiber-substrate material 8, for example via resin bath component 20b, as shown in FIG. 2B.

The winding step includes applying or winding the resin-fiber material 22 onto a shaped surface 25 as described herein at a winding velocity ($\omega_2$). In any embodiment, the shaped surface 25 (e.g., a mandrel) can have a cylindrical shape and the resin-fiber material 22 can be circumferentially applied around the shaped surface 25. In any embodiment, the shaped surface 25 can comprise a metal material. In some embodiments, the shaped surface 25 includes two components, such as a mandrel with a metal component (e.g., a motor housing), disposed on the mandrel. In such embodiments, the resin-fiber material 22 can be applied around the metal component.

The solidifying step includes applying heat, for example, indirectly or directly, to the resin-fiber material 22 to initiate an exothermic reaction as described herein comprising polymerization, cross-linking, or both of the uncured resin composition to form the composite article. Heat may be applied from a heat source 32 as described herein. For example, the solidifying step may include applying heat to the shaped surface 25 (e.g. mandrel) while the shaped surface rotates and winds the resin-fiber material 22, wherein polymerization, cross-linking or both of the uncured resin composition, i.e., the polymerization front, progresses in an outward radial direction, circumferential direction, an axial direction, or a combination through a thickness 160 of the resin-fiber material 22 present on the shaped surface 25, as shown in FIG. 1C. Alternatively, heat may be applied to resin-fiber material 22 present on the shaped surface 25 (e.g., mandrel) and/or resin-fiber material 22 prior to being wound onto the shaped surface 25 (e.g., mandrel) after some resin-fiber material 22 has been wound onto the shaped surface 25 thereby initiating an exothermic reaction of the uncured resin composition. As illustrated in FIG. 1E, after initiating the exothermic reaction, polymerization, cross-linking, or both of the uncured resin composition, i.e., the polymerization front, can continue in an inward radial direction as illustrated by arrows 172, a circumferential direction as illustrated by arrows 171, an axial direction as illustrated by arrows 173, or a combination thereof through the thickness 160 of the resin-fiber material 22 as well as into a portion of the resin-fiber material 22 prior to its application onto the shaped surface 25 (e.g., mandrel). In some embodiments, heat may be applied continuously to the shaped surface 25 while the shaped surface 25 rotates and winds the resin-fiber material and/or heat may be applied continuously to the resin-fiber material 22 as it is wound onto the shaped surface 25. It is also contemplated herein that application of heat to the shaped surface 25 may be ceased, turned back on and/or the temperature of the heat applied may be raised or lowered during the methods described herein. Polymerization, cross-linking, or both of the remaining uncured resin composition, i.e., the polymerization front, can continue even in the absence of applied heat due to the self-propagating exothermic reaction initiated.

The method can further include monitoring a temperature of the resin-fiber material 22, for example within region 38, as it is wound onto shaped surface 25, for example, via a polymerization front monitoring system 50 as described herein. As discussed above, a determination of $v_{pfs}$, $v_{pfo}$, $l_{pfo}$, and/or $l_{pfs}$ can be made from monitoring the temperature of the resin-fiber material 22. In order to maintain a $v_{pfo}$ that is substantially the same as the $v_{pfs}$ and/or an $l_{pfo}$ that is substantially the same as the $l_{pfs}$, for example, within region 38, various method parameters may be adjusted. For example, the unwinding velocity ($\omega_1$) and/or winding velocity ($\omega_2$) can be adjusted based upon the polymerization front velocity such that the unwinding velocity ($\omega_1$) and the winding velocity ($\omega_2$) remain substantially the same to maintain a tension within fiber substrate material 8 as it is unwound and the resin-fiber material 22 as it wound.

Figure 3A:
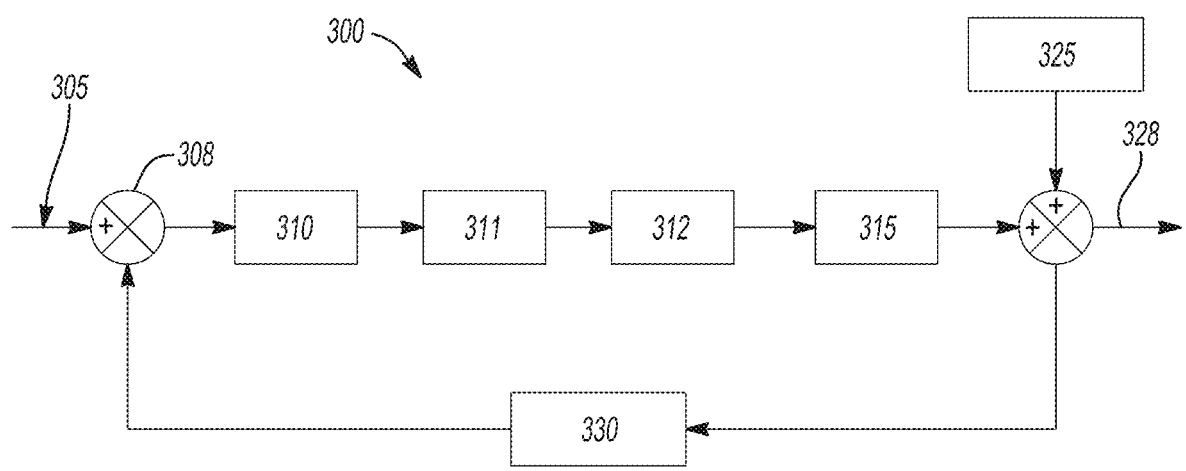
FIG. 3A illustrates a control feedback loop according to some aspects of the present disclosure.

For example, as shown in FIG. 3A, a control feedback loop 300 can be created and maintained such that unwinding velocity ($\omega_1$) can be adjusted based on polymerization front location such that a constant winding tension can be maintained between creel 5 and shaped surface 25 (e.g., mandrel). As illustrated in FIG. 3A, in a closed-loop control method, tension sensor 330 feeds back a real-time tension measurement of a fiber tow (e.g., fiber substrate material 8 and resin-fiber material 22) between creel 5 and shaped surface 25 (e.g., mandrel) with a desired tension input 305 and a response tension output 328. The feedback control loop can continuously update in real-time a controller 310 (e.g. controller 60), driver 311, motor 312 (e.g., first motor 18, second motor 35), and unwinding creel 315 (e.g., creel 5) until the desired winding tension is achieved. A polymerization front disturbance 325 (i.e., location of the polymerization front ($l_{pfo}$) with respect to its idealized location ($l_{pfs}$)) can also be inputted into the control loop so that the desired winding tension is achieved. The polymerization front location can be determined as described herein.

An application of the control feedback loop 300 is shown in FIGS. 3B and 3C. In a first step 401, resin-fiber material 22 is applied to shaped surface 25 (e.g. mandrel), wherein symbol 430 represents uncured or liquid resin composition. In second step 402, a heated wire 410 (e.g., heat source 32) is applied to the resin-fiber material 22 as it is wound onto shaped surface 25 to initiate an exothermic reaction comprising polymerization, cross-linking, or both of the uncured resin composition, wherein symbol 440 represents solidified or cured resin composition. In third step 403, application of heated wire 410 is ceased and as shown in fourth step 404, polymerization, cross-linking, or both of the uncured resin composition continues in a radial, axial and circumferential directions, where the dotted line indicates the edge of the polymerization front. As shown in fifth step 405, $l_{pfo}$ 420 can be subsequently determined. An exploded view of step 405 and the $l_{pfo}$ 420 is shown in FIG. 3C. As illustrated in FIG. 3C, $l_{pfo}$ 420 includes localized reaction zone 470, solidifying or curing resin composition 460 (e.g., sol/gel/rubber region), further solidifying or curing resin composition 450 (e.g., sol/gel/rubber region) and solidified or cured resin composition 440 (e.g., gelled/glass region). The polymerization wave front propagates in a direction as illustrated by arrow 170a toward uncured or liquid resin composition 430. Uncured or liquid resin composition 430 has a degree of cure of the resin composition of $x_0$. Solidified or cured resin composition 440 has a degree of cure of the resin composition of $x_1$. Further solidifying or curing resin composition 450 has a degree of cure of the resin composition of $x_2$. Solidifying or curing resin composition 460 has a degree of cure of the resin composition of $x_3$. Localized reaction zone 470 has a degree of cure of the resin composition of $x_4$. During polymerization, cross-linking or both of the uncured resin composition, the relationship of $x_0$, $x_1$, $x_2$, $x_3$, $x_4$ can be as follows: $x_1 > x_2 > x_3 > x_4 > x_0$, wherein each of $x_0$, $x_1$, $x_2$, $x_3$, $x_4$ can range from zero to 1. In any embodiment, $x_1$ can be 1 and $x_0$ can be zero.

Additionally or alternatively, the heat applied indirectly or directly to the resin-fiber material 22 can be adjusted. For example, if temperature of the resin-fiber material 22 is higher than desired, one or more of the following parameters can be adjusted: (i) the unwinding velocity ($\omega_1$) and/or winding velocity ($\omega_2$) can be increased; (ii) the application of heat can be ceased; and (iii) the temperature of the heat applied can be reduced. Alternatively, if temperature of the resin-fiber material 22 is lower than desired, one or more of the following parameters can be adjusted: (i) the unwinding velocity ($\omega_1$) and/or winding velocity ($\omega_2$) can be decreased; (ii) the application of heat can be turned on if previously stopped; and (iii) the temperature of the heat applied can be increased. It is contemplated herein that the method steps disclosed herein can be continuously and substantially simultaneously performed.

In various aspects, the composite article formed by the methods described herein includes a composite material including the solidified resin composition and the fiber substrate material. In other embodiments, the first component 26, for example, a metal component, can be intended for incorporation into the finished composite article; thus, a composite article can include a composite material including the solidified resin composition and the fiber substrate material as well as the first component 26.

In some embodiments, the methods described herein may further include a further heating of the composite article to further solidify the resin composition. For example, the composite article may be heated in an oven to further solidify or complete solidification of the resin composition, for example, to achieve the gelled/glass region 270 of the resin composition.

The methods described herein can be applied to various applications for forming various composite articles. Exemplary composite articles that can be formed from the methods described herein include, but are not limited to automotive components, such as composite (e.g., carbon fiber composite) overwrapped aluminum pinion cartridges, composite (e.g., carbon fiber composite) driveshafts, hydrogen storage tanks, composite (e.g., carbon fiber composite) overwrapped shrink fit motor housing, and so on, and nonautomotive articles, such as golf shafts, pipes, bicycle components, transmission poles, aircraft fuselages, ship masts and so on.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a composite article, the method comprising:
    an unwinding step comprising unwinding a fiber substrate material from a creel at an unwinding velocity ($\omega_1$) with a first motor operably connected to the creel and configured to rotate the creel at the unwinding velocity ($\omega_1$);
    an impregnation step comprising applying an uncured resin composition to the fiber substrate material to form a resin-fiber material;
    a winding step comprising applying the resin-fiber material onto a shaped surface at a winding velocity ($\omega_2$) with a second motor operably connected to the shaped surface and configured to rotate the shaped surface at the winding velocity ($\omega_2$);
    a solidifying step comprising applying heat indirectly or directly to the resin-fiber material to initiate an exothermic reaction comprising polymerization, cross-linking, or both of the uncured resin composition to form the composite article;
    monitoring the resin-fiber material and determining a polymerization front velocity set point ($v_{pfs}$) and an operating polymerization front velocity ($v_{pfo}$) via a polymerization front monitoring system; and
    adjusting via a controller in communication with the unwinding step, the winding step, and the polymerization front monitoring system one or more of the following parameters to maintain a vpfo that is substantially the same as the $v_{pfs}$:
    (i) the unwinding velocity ($\omega_1$) and/or the winding velocity ($\omega_2$); and
    (ii) the heat applied to the resin-fiber material.

2. The method of claim 1, wherein the shaped surface has a cylindrical shape and the resin-fiber material is circumferentially applied around the shaped surface, and wherein the shaped surface comprises a metal material.

3. The method of claim 1, wherein the solidifying step comprises applying the heat to the shaped surface while the shaped surface rotates and winds the resin-fiber material, wherein polymerization, cross-linking or both of the uncured resin composition progresses in an outward radial direction, a circumferential direction, an axial direction, or a combination thereof through a thickness of the resin-fiber material present on the shaped surface.

4. The method of claim 3, wherein the heat is applied continuously to the shaped surface while the shaped surface rotates and winds the resin-fiber material.

5. The method of claim 1, wherein the solidifying step comprises applying the heat to the resin-fiber material as it is wound onto the shaped surface, wherein polymerization, cross-linking or both of the uncured resin composition progresses in an inward radial direction, a circumferential direction, an axial direction, or a combination thereof through a thickness of the resin-fiber material present on the shaped surface.

6. The method of claim 1, wherein the solidifying step comprises ceasing application of the heat after initiation of the exothermic reaction, wherein polymerization, cross-linking or both of a remaining uncured resin composition continues in a radial direction, a circumferential direction, an axial direction, or a combination thereof through a thickness of the resin-fiber material in the absence of the application of heat to form the composite article.

7. The method of claim 1, wherein the heat is applied from a heat source selected from the group consisting of a heating coil, a heated rod, a heat blanket, a heat lamp, heated air, an ultraviolet source, an oven, or a combination thereof.

8. The method of claim 1, wherein the uncured resin composition comprises a thermoplastic resin or a thermoset resin, and optionally, a hardener component, a catalyst component or a combination thereof, and wherein the fiber substrate material is selected from the group consisting of carbon fibers, glass fibers, basalt fibers, aramid, polyethylene fibers, polypropylene fibers, natural fibers, and a combination thereof.

9. The method of claim 1, wherein the heat is applied for a period of 300 seconds or less.

10. The method of claim 1, wherein the shaped surface is:
    a mandrel; or
    a metal component disposed on a mandrel, wherein the resin-fiber material is applied onto the metal component.

11. The method of claim 10, wherein the composite article comprises the shaped surface, a solidified resin composition, and the fiber substrate material or the composite article comprises the solidified resin composition, the fiber substrate material, and the metal component.

12. The method of claim 1, wherein the impregnation step further comprises separately supplying a resin component, an optional hardener component, and an optional catalyst component to a mixer to form the uncured resin composition.

13. The method of claim 1, wherein application of the uncured resin composition comprises separately applying:
    (i) a resin component to the fiber substrate material; and (ii) a hardener component, a catalyst component, or both to the fiber substrate material.

14. A system for making a composite article, the system comprising:
    an unwinding component comprising:
        a creel wound with a fiber substrate material; and
        a first motor operably connected to the creel and configured to rotate the creel at an unwinding velocity ($\omega_1$);
    a resin bath component for impregnating the fiber substrate material received therein with an uncured resin composition to form a resin-fiber material, wherein the resin bath component comprises:

a single container for containing the uncured resin composition; or a first container for containing a resin component and a second container for containing a hardener component, a catalyst component, or both;

a winding component comprising:

a mandrel for receiving the resin-fiber material;

a second motor operably connected to the mandrel and configured to rotate the mandrel at a winding velocity ($\omega_2$); and a heat source for solidifying the uncured resin composition to form the composite article;

a polymerization front monitoring system configured to determine a polymerization front velocity set point ($v_{pfs}$) and an operating polymerization front velocity ($v_{pfo}$); and a controller in communication with the unwinding component, the winding component, and the polymerization front monitoring system, wherein in order to maintain a $v_{pfo}$ that is substantially the same as the $v_{pfs}$, the controller is configured to adjust one or more of the following parameters:

(i) the unwinding velocity ($\omega_1$) and/or the winding velocity ($\omega_2$); and (ii) the heat source.

15. The system of claim 14, wherein the heat source initiates an exothermic reaction comprising polymerization, cross-linking, or both of the uncured resin composition.

16. The system of claim 14, wherein the resin bath component further comprises:

a third container for containing a resin component;

optionally, a fourth container for containing a hardener component;

optionally, a fifth container for containing a catalyst component; and a mixer for mixing the resin component, optional hardener component, and optional catalyst component, wherein the mixer is in fluid communication with the single container, the third container, the optional fourth container, and the optional fifth container.

17. The system of claim 14, wherein the heat source is selected from the group consisting of a heating coil, a heated rod, a heat blanket, a heat lamp, a heated wire, heated air, an ultraviolet source, an oven, a visible light source, or a combination thereof.

18. The system of claim 14, wherein the uncured resin composition comprises a thermoplastic resin or a thermoset resin, and optionally, a hardener component, a catalyst component or a combination thereof, and wherein the fiber substrate material is selected from the group consisting of carbon fibers, glass fibers, basalt fibers, aramid, polyethylene fibers, polypropylene fibers, natural fibers, and a combination thereof.

* * * * *